(12) United States Patent
Cai

(10) Patent No.: US 12,155,785 B2
(45) Date of Patent: Nov. 26, 2024

(54) STAND FOR MOBILE DEVICE

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 203 days.

(21) Appl. No.: 18/095,990

(22) Filed: Jan. 11, 2023

(65) Prior Publication Data

US 2023/0403351 A1    Dec. 14, 2023

(30) Foreign Application Priority Data

Jun. 10, 2022    (CN) .......................... 202221438592.1

(51) Int. Cl.
    *H04M 1/04*    (2006.01)
(52) U.S. Cl.
    CPC .................................. *H04M 1/04* (2013.01)

(58) Field of Classification Search
    CPC ......... H04M 1/04; F16M 11/06; F16M 11/40; F16M 2200/08
    See application file for complete search history.

(56) References Cited

U.S. PATENT DOCUMENTS

| 2012/0106040 A1* | 5/2012 | Li ......................... F16M 11/10 |
| | | 361/679.01 |
| 2023/0020938 A1* | 1/2023 | Liu ...................... F16M 11/041 |

* cited by examiner

*Primary Examiner* — Tuan D Nguyen

(57) ABSTRACT

A stand for a mobile device includes a support, a flipping cover embedded in a middle portion of the support, and a pivoting mechanism pivoting the support and the flipping cover. Two sides of the support and two sides of the flipping cover define pivoting holes configured to mount the pivoting mechanism. The pivoting mechanism includes at least one pivoting positioning piece arranged on one side of the support. The at least one pivoting positioning piece includes a rotating shaft and a fixing sleeve. The fixing sleeve is arranged in a corresponding pivoting hole of the flipping cover. A first end of the rotating shaft is embedded in a corresponding pivoting hole of the support. A second end of the rotating shaft is embedded in the fixing sleeve. A plurality of grooves is defined on the fixing sleeve. One end of the fixing sleeve has a jagged end face.

9 Claims, 4 Drawing Sheets

STAND FOR MOBILE DEVICE

TECHNICAL FIELD

The present disclosure relates to a technical field of support technology, and in particular to a stand for a mobile device.

BACKGROUND

With continuous improvement of people's living standards and increasing material abundance, various mobile devices (such as mobile phones, tablets, and laptops) are created. mobile devices realize a communication function, an Internet function, an entertainment function, a game function, etc., providing people with a very good user experience. With flourishing of mobile devices, there are a lot of support stands working with the mobile devices starting up in the market.

In a process of using the mobile devices, the mobile devices need to be equipped with support stands to use in many cases. The support stands generally comprise a base plate and a support plate, and the base plate and the support plate are mostly connected with each other by a pin. Meanwhile, the base plate is connected with the support plate by a support rod. An angle between the support plate and the base plate is adjusted by changing a position of the support rod, so the support stands are able to support different mobile devices. However, a gap between the pin and pivoting holes of a conventional support stand is usually large. During a process of adjusting the angle between the support plate and the base plate, the gap biases a mobile device placed on the conventional support stand to the left or to the right of the conventional support stand, making support stability poor. Moreover, during the process of adjusting the angle between the support plate and the base plate, the position of the support rod is frequently adjusted, which is inconvenient for a user to use. Therefore, how to provide a stand for the mobile device with good support stability and easy to adjust angle is a pressing problem for those skilled in the art.

SUMMARY

In view of this, the present disclosure provides a stand for a mobile device. A fixing sleeve is first placed in one pivoting hole on a side wall of the flipping cover, and then a first end of a rotating shaft sequentially passes through one pivoting hole on a side wall of a support and the fixing sleeve, and a second end of the rotating shaft is fixedly embedded in the other pivoting hole on another side wall of the support. Therefore, the flipping cover is stably connected with the support. Meanwhile, angle adjustment and pivot positioning between the flipping cover and the support are realized through interference fit between the rotating shaft and the fixing sleeve, which improves a convenience of angle adjustment of the stand for the mobile device.

The present disclosure provides the stand for the mobile device. The stand for the mobile device comprises a support, a flipping cover embedded in a middle portion of the support, and a pivoting mechanism pivoting the support and two sides of the flipping cover. Two sides of the support and the two sides of the flipping cover define pivoting holes configured to mount the pivoting mechanism. The pivoting mechanism comprises at least one pivoting positioning piece. The at least one pivoting positioning piece is arranged on one side of the support. The at least one pivoting positioning piece comprises a rotating shaft and a fixing sleeve. The fixing sleeve is arranged in a corresponding pivoting hole on a side wall of the flipping cover. A first end of the rotating shaft is fixedly embedded in a corresponding pivoting hole on a side wall of the support. A second end of the rotating shaft is movably embedded in the fixing sleeve. A plurality of grooves is defined on a surface of the fixing sleeve. One end of the fixing sleeve inserting into a corresponding pivoting hole of the flipping cover has a jagged end face.

Furthermore, a diameter of the rotating shaft is greater than a diameter of the fixing sleeve.

Furthermore, the second end of the rotating shaft movably embedded in the fixing sleeve is a boss structure.

Furthermore, a surface of the first end of the rotating shaft fixedly embedded in the corresponding pivoting hole on the side wall of the support annularly defines fixed grooves parallel to an axis of the rotating shaft.

Furthermore, the plurality of grooves defined on the surface of the fixing sleeve is spaced apart and extends axially toward the fixing sleeve.

Furthermore, the fixing sleeve defines an opening running through the fixing sleeve.

Furthermore, the at least one pivoting positioning piece further comprises a gasket. The gasket is arranged on a corresponding pivoting hole on the side wall of the flipping cover.

Furthermore, at least one first convex portion is arranged on a surface of a bottom portion of the flipping cover. The at least one first convex portion is perpendicular to the surface of the bottom portion of the flipping cover and extends outwards. A first foam is arranged on a surface of the at least one first convex portion. The at least one first convex portion is configured to support a bottom portion of the mobile device.

Furthermore, a second convex portion is arranged on an inner side of a top portion of the support. The second convex portion extends towards a bottom portion of the support. A second foam is arranged on a surface of the second convex portion; the second convex portion is configured to support the mobile device having a small size.

Compared with the prior art, in the present disclosure, the fixing sleeve is first placed in the corresponding pivoting hole on the side wall of the flipping cover, and then the first end of the rotating shaft sequentially passes through the corresponding pivoting hole on the side wall of the support and the fixing sleeve. In an expanding process of a sleeve body of the fixing sleeve, the plurality of grooves defined on the surface of the fixing sleeve is pressed against an inner wall of the corresponding pivoting hole on the side wall of the flipping cover, Because the plurality of grooves deforms along with corresponding deformation of the sleeve body, so that the fixing sleeve presses on and fixes in the corresponding pivoting hole on the side wall of the flipping cover. Meanwhile, the jagged end face of the fixing sleeve expands toward an outside of the fixing sleeve along a radial direction of the fixing sleeve and is embedded in the inner wall of the corresponding pivoting hole on the side wall of the flipping cover, which further enhances pressing stability between the corresponding pivoting hole on the side wall of the flipping cove and the fixing sleeve. Furthermore, the second end of the rotating shaft is fixedly embedded in the other pivoting hole on another side wall of the support. Therefore, the flipping cover is stably connected with the support, which solves a problem that the mobile device is shifted to the left or right of the stand for the mobile device in a process of adjusting an angle between the flipping cover and the support. Furthermore, angle adjustment and pivot positioning between the flipping cover and the support are realized through interference fit between the rotating shaft and the fixing sleeve, which improves a convenience of angle adjustment of the stand for the mobile device.

DETAILED DESCRIPTION

Figure 1:
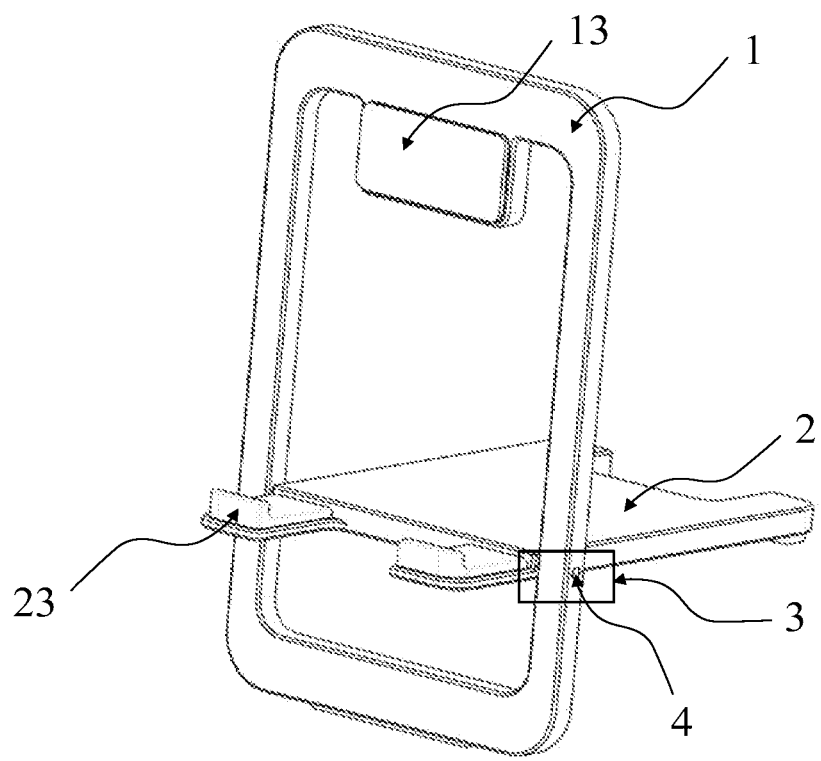
FIG. 1 is a schematic diagram of a stand for a mobile device of the present disclosure.

To facilitate a good understanding of the purpose, structure, features, and efficacy, etc. of the present disclosure, a stand for a mobile device of the present disclosure is further described in conjunction with accompanying drawings and specific embodiments. As shown in FIGS. 1-5, the present disclosure provides the stand for the mobile device. The stand for the mobile device comprises a support 1, a flipping cover 2 embedded in a middle portion of the support 1, and a pivoting mechanism 3 pivoting the support 1 and two sides of the flipping cover 2. Two sides of the support 1 and the two sides of the flipping cover 2 define pivoting holes 4 configured to mount the pivoting mechanism 3. The pivoting mechanism 3 comprises at least one pivoting positioning piece 31. The at least one pivoting positioning piece 31 comprises a rotating shaft 311 and a fixing sleeve 312. The fixing sleeve 312 is arranged in a corresponding pivoting hole 4 on a side wall of the flipping cover 2. A first end of the rotating shaft 311 is fixedly embedded in a corresponding pivoting hole 4 on a side wall of the support 1. A second end of the rotating shaft 311 is movably embedded in the fixing sleeve 312. A plurality of grooves is defined on a surface of the fixing sleeve 312. One end of the fixing sleeve 312 inserting into a corresponding pivoting hole 4 of the flipping cover 2 has a jagged end face.

In the embodiment, the support 1 is a hollow frame structure. The flipping cover 2 is a flat plate structure mating with the support 1. The flipping cover 2 is embedded in a hollow portion of the hollow frame structure. The two sides of the support 1 is pivoted with the two sides of the flipping cover 2 by the pivoting mechanisms 3. The pivoting mechanism 3 comprises two pivoting positioning pieces 31. The two pivoting positioning pieces 31 are arranged on two sides of the support 1. The pivoting positioning pieces 31 are configured to realize angle adjustment and pivoting positioning between the flipping cover 2 and the support 1.

In other embodiments, the pivoting mechanism 3 comprises one pivoting positioning piece 31 and a common rotating rod. The one pivoting positioning piece 31 is arranged on one side of the stand for mobile device and the common rotating rod is arranged on another side of the stand for mobile device. The two sides of the support 1 and the two sides of the flipping cover 2 define the pivoting holes 4 configured to mount the pivoting mechanism 3. The one pivoting positioning piece 31 comprises the rotating shaft 311 and the fixing sleeve 312. The plurality of grooves is defined on the surface of the fixing sleeve 312. The one end of the fixing sleeve 312 away from the corresponding pivoting hole 4 of the support 1 has the jagged end face.

Each pivoting positioning piece 31 is mounted as follow. each fixing sleeve 312 is first placed in a corresponding pivoting hole 4 on the side wall of the flipping cover 2, and then the first end of each rotating shaft 311 sequentially passes through a corresponding pivoting hole 4 on the side wall of the support 1 and the fixing sleeve 312. In an expanding process of a sleeve body of each fixing sleeve 312, the plurality of grooves 314 defined on the surface of the fixing sleeve 312 is pressed against an inner wall of the corresponding pivoting hole 4 on the side wall of the flipping cover 2. The plurality of grooves 314 deforms and expands along with each fixing sleeve 312, so that each fixing sleeve 312 presses on and fixes in the corresponding pivoting hole 4 on the side wall of the flipping cover 2. Meanwhile, the jagged end face of each fixing sleeve 312 expands toward an outside of the fixing sleeve 312 along a radial direction of the fixing sleeve 312 and is embedded in the inner wall of the corresponding pivoting hole 4 on the side wall of the flipping cover 2, which further enhances pressing stability between the corresponding pivoting hole 4 on the side wall of the flipping cove 2 and the fixing sleeve 312. Furthermore, the second end of the rotating shaft 311 is fixedly embedded in the other pivoting hole 4 on another side wall of the support 1. Therefore, the flipping cover 2 is stably connected with the support 1, which solves a problem that the mobile device is shifted to the left or right of the stand for the mobile device in a process of adjusting an angle between the flipping cover 2 and the support 1. Furthermore, angle adjustment and pivot positioning between the flipping cover 2 and the support 1 are realized through interference fit between the rotating shaft 311 and the fixing sleeve 312, which improves a convenience of angle adjustment of the stand for the mobile device.

In one optional embodiment, a first protecting foam 14 is arranged on a bottom side of the support 1 and second protecting foam 24 are arranged on a rear side of a top portion of the flipping cover 2, increasing support stability of the stand for the mobile device.

Figure 2:
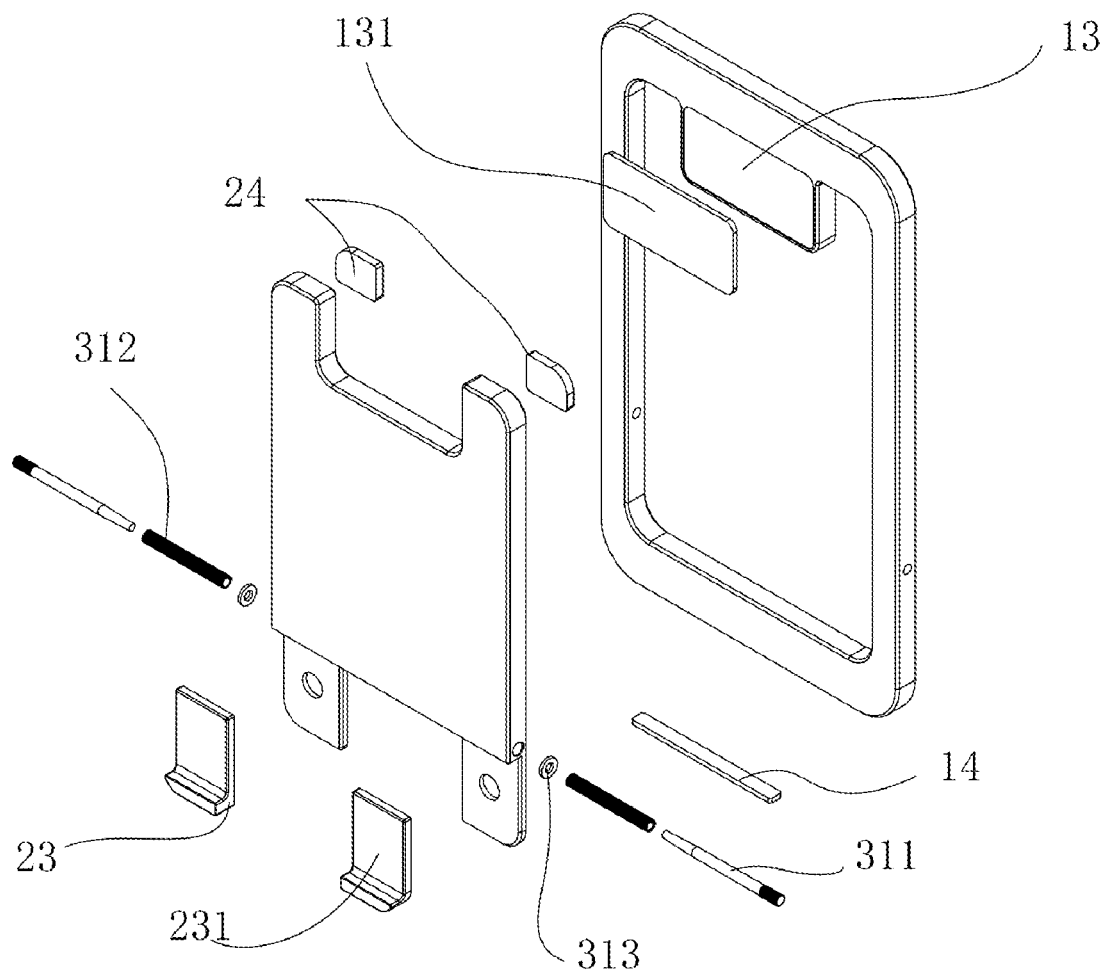
FIG. 2 is an exploded schematic diagram of the stand for the mobile device shown in FIG. 1.
Figure 4:
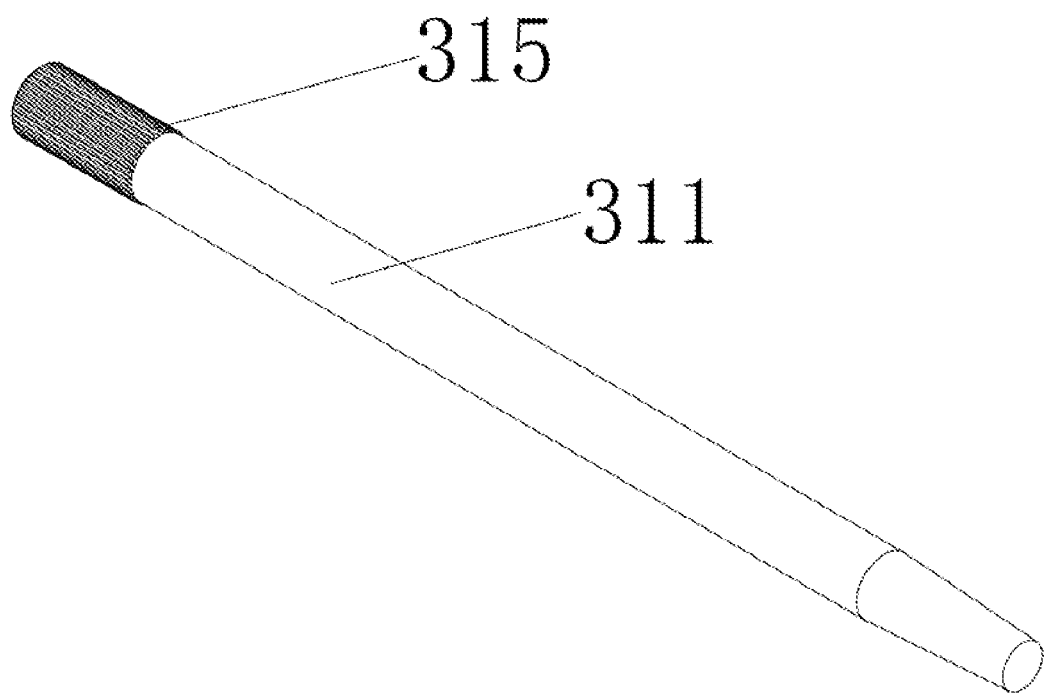
FIG. 4 is a schematic diagram of a rotating shaft of the pivoting positioning piece of the present disclosure.
Figure 5:
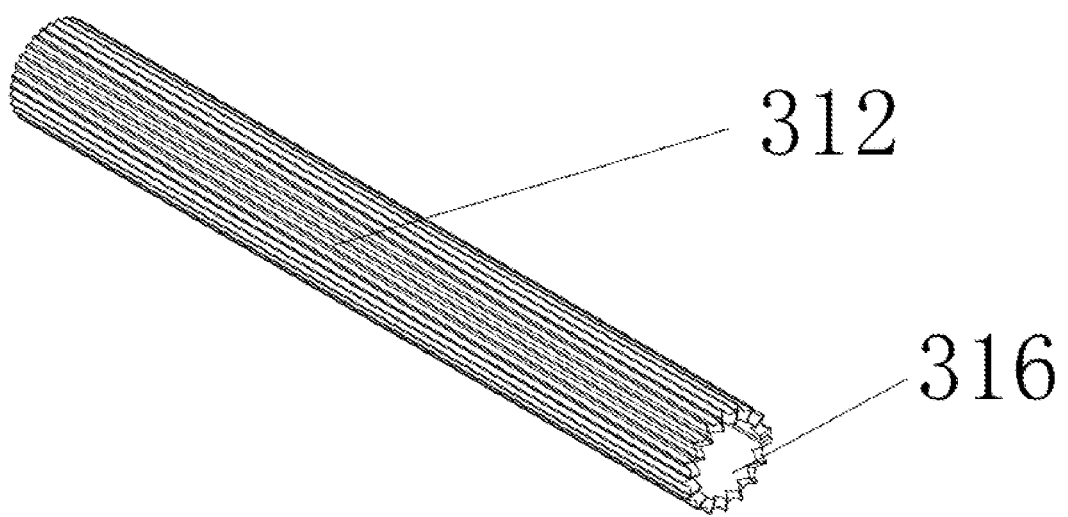
FIG. 5 is a schematic diagram of a fixing sleeve of the pivoting positioning piece of the present disclosure.

As shown in FIGS. 2, 4, and 5, a diameter of each rotating shaft 311 is greater than a diameter of each fixing sleeve 312.

In the example, since the diameter of each rotating shaft 311 is configured to be greater than the diameter of each fixing sleeve 312, when each rotating shaft 311 passes through a corresponding fixing sleeve 312, each fixing sleeve 312 is expanded. At this time, the plurality of grooves defined on the surface of each fixing sleeve 312 presses against the inner wall of the corresponding pivoting hole 4 on the side wall of the flipping cover 2. Because the plurality of grooves deforms and expands during the expanding process, so that each fixing sleeve 312 presses on and fixes in the corresponding pivoting hole 4 on the side wall of the flipping cover 2. Meanwhile, each rotating shaft 311 tightly contacts an inner wall of the corresponding fixing sleeve 312, realizing the angle adjustment and the pivot positioning between the flipping cover 2 and the support 1 through interference fit between each rotating shaft 311 and the corresponding fixing sleeve 312.

Figure 3:
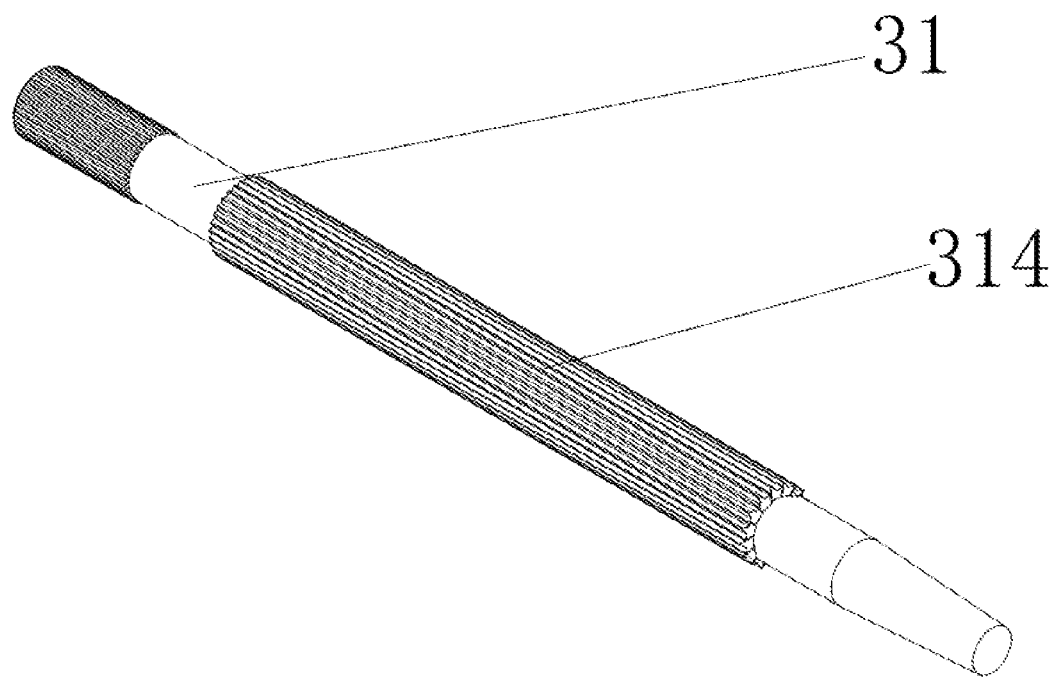
FIG. 3 is a schematic diagram of a pivoting positioning piece of the present disclosure.

As shown in FIGS. 2-4, the second end of each rotating shaft 311 movably embedded in the corresponding fixing sleeve 312 is a boss structure.

In the embodiment, the second end of each rotating shaft 311 movably embedded in the corresponding fixing sleeve 312 is configured as the boss structure, which is convenient for each rotating shaft 311 to pass through the corresponding pivoting hole 4 on the side wall of the support land the corresponding fixing sleeve 312, so that each pivoting positioning piece 3 is easily and efficiently installed.

As shown in FIGS. 2 and 4, a surface of the first end of each rotating shaft 311 fixedly embedded in the corresponding pivoting hole 4 on the side wall of the support 1 annularly defines fixed grooves 315 parallel to an axis of each rotating shaft 311.

In the embodiment, the surface of the first end of each rotating shaft 311 annularly defines the fixed grooves 315 parallel to the axis of each rotating shaft 311, so each rotating shaft 311 is fixedly embedded in the support 1 after passing through the corresponding pivoting hole 4 on the side wall of the support 1, preventing each rotating shaft 311 from separating from the corresponding pivoting hole 4 on the side wall of the support 1.

Of course, in other embodiments, the fixed grooves 315 on the surface of each rotating shaft 311 may also be distributed in other forms. For example, the fixed grooves 315 are distributed in a semi-circular shape, a sheet-like shape, etc. Further, the fixed grooves 315 may also be arranged in other directions, such as perpendicular to the axis of each rotating shaft 311, form a certain angle with respect to the axis of each rotating shaft 311, etc., which is not limited therein.

As shown in FIGS. 2, 3 and 5, the plurality of grooves 314 defined on the surface of each fixing sleeve 312 is spaced apart and extends axially toward each fixing sleeve.

In the embodiment, the plurality of grooves 314 defined on the surface of each fixing sleeve 312 is spaced apart and extends axially toward each fixing sleeve. On one hand, the plurality of grooves 314 extending axially is convenient for each fixing sleeve 312 to insert into the corresponding pivoting hole 4 on the side wall of the flipping cover 2. On the other hand, since the plurality of grooves 314 is spaced apart, when each rotating shaft passes through the corresponding fixing sleeve, the corresponding fixing sleeve expands, causing the deformation of the plurality of grooves. Thus, the plurality of grooves 314 defined on the surface of the corresponding fixing sleeve 312 presses against the inner wall of the corresponding pivoting hole 4 on the side wall of the flipping cover 2. As a result, each fixing sleeve 312 presses on and fixes in the corresponding pivoting hole 4 on the side wall of the flipping cover 2. Of course, in other embodiments, the plurality of grooves 314 on the surface of each fixing sleeve 312 may be distributed in other forms. E.g., the plurality of grooves is circular recesses defined along a radial direction of each fixing sleeve 312, the plurality of grooves is strap-shaped grooves extending along a direction which forms a certain angle with respect to an axial direction of each fixing sleeve 312, etc., which is not limited therein.

As shown in FIGS. 2, 3, and 5, each fixing sleeve 312 defines an opening 316 running through the fixing sleeve 312.

In the embodiment, each fixing sleeve 312 defines the opening 316 running through the corresponding fixing sleeve 312, so when each rotating shaft passes through the corresponding fixing sleeve, the corresponding fixing sleeve expands, causing the deformation of the plurality of grooves 314. Thus, the plurality of grooves 314 defined on the surface of the corresponding fixing sleeve 312 presses against the inner wall of the corresponding pivoting hole 4 on the side wall of the flipping cover 2. As a result, each fixing sleeve 312 presses on and fixes in the corresponding pivoting hole 4 on the side wall of the flipping cover 2.

As shown in FIG. 2, each pivoting positioning piece 31 further comprises a gasket 313. Each gasket 313 is arranged on a corresponding pivoting hole 4 on the side wall of the flipping cover 2.

In the embodiment, by arranging each gasket 313 on the corresponding pivoting hole 4 on the side wall of the flipping cover 2, one end of each fixing sleeve 312 close to a bottom portion of the corresponding pivoting hole 4 on the side wall of the flipping cover 2 is not displaced with respect to the bottom portion of the corresponding pivoting hole 4 during the process of each rotating shaft 311 passing through the corresponding fixing sleeve 312. Therefore, each fixing sleeve 312 is not worn.

As shown in FIGS. 1 and 2, first convex portions 23 are arranged on a surface of a bottom portion of the flipping cover 2. The first convex portions are perpendicular to the surface of the bottom portion of the flipping cover 2 and extend outwards. A first foam 231 is arranged on a surface of each of the first convex portions 23. The first convex portions are configured to support a bottom portion of the mobile device.

In the embodiment, the first convex portions 23 perpendicular to the surface of the bottom portion of the flipping cover 2 and extending outwards are arranged on the surface of the bottom portion of the flipping cover 2. The first convex portions 23 are two L-shaped silicone pads arranged on two sides of the bottom portion of the flipping cover 2. A shape of the bottom portion of the flipping cover 2 matches a shape of each of the first convex portions 23. The bottom portion of the flipping cover 2 and the L-shaped silicone pads define through holes. Fasteners pass through corresponding through holes to connect the L-shaped silicone pads to the flipping cover 2. Protruding portion of the L shaped silicone pads support the bottom portion of the mobile device.

As shown in FIGS. 1 and 2, a second convex portion 13 is arranged on an inner side of a top portion of the support 1. The second convex portion 13 extends towards a bottom portion of the support 1. A second foam 131 is arranged on a surface of the second convex portion 13. The second convex portion is configured to support the mobile device having a small size and increase stability of the mobile device on the support 1.

In the embodiment, the second convex portion 13 is arranged on the inner side of the top portion of the support 1. By the arrangement of the second convex portion 13, the support 1 is adapted to the mobile device having a small size. The second foam 131 is arranged on the surface of the second convex portion 13, effectively preventing the mobile device from moving or shaking on the support 1 without subjective will of the user and increasing the stability of the mobile device on the support 1. A shape of the top portion of the flipping cover 2 has a concave shape matched with a shape of the second convex portion 13 arranged on the top portion of the support 1, so that the flipping cover 2 is in a same plane with the support 1 when the flipping cover 2 is in a closed state, which not only makes the stand for the mobile device look beautiful, but also facilitates storage of the stand for he mobile device.

In one optional embodiment, the mobile device may be a mobile phone, a tablet, or a tablet-like portable device. Of course, in other embodiments, the mobile device may be the mobile device having other shapes, such as a polygonal mobile device, a round mobile device, a prismatic conical mobile device, etc. which is not limited thereto.

In summary, in the stand for the mobile device of the present disclosure, each fixing sleeve is first placed in the corresponding pivoting hole on the side wall of the flipping cover, and then the first end of each rotating shaft sequentially passes through the corresponding pivoting hole on the side wall of the support and the corresponding fixing sleeve. In the expanding process of the sleeve body of each fixing sleeve, the corresponding grooves deform, so the plurality of grooves defined on the surface of the fixing sleeve is pressed against the inner wall of the corresponding pivoting hole on the side wall of the flipping cover. Therefore, each fixing sleeve presses on and fixes in the corresponding pivoting hole on the side wall of the flipping cover. Meanwhile, the jagged end face of each fixing sleeve opens toward the outside of each fixing sleeve along the radial direction of the fixing sleeve and is embedded in the inner wall of the corresponding pivoting hole on the side wall of the flipping cover, which further enhances pressing stability of the corresponding pivoting hole on the side wall of the flipping cove and the fixing sleeve. Furthermore, the second end of each rotating shaft is fixedly embedded in the other pivoting hole on another side wall of the support. Therefore, the flipping cover is stably connected with the support, which solves the problem that the mobile device is shifted to the left or right of the stand for the mobile device in the process of adjusting the angle between the flipping cover and the support. Furthermore, the angle adjustment and the pivot positioning between the flipping cover and the support are realized through interference fit between each rotating shaft and the corresponding fixing sleeve, which improves the convenience of the angle adjustment of the stand for the mobile device.

Foregoing descriptions are only optional embodiments of the present disclosure and are not intended to limit the present disclosure. Any modification, or equivalent replacement made based on the specification and drawings of the present disclosure should be included in the protection scope of the present disclosure.

What is claimed is:

1. A stand for a mobile device; comprising:
   a support;
   a flipping cover embedded in a middle portion of the support; and
   a pivoting mechanism pivoting the support and two sides of the flipping cover;
   wherein two sides of the support and the two sides of the flipping cover define pivoting holes configured to mount the pivoting mechanism; the pivoting mechanism comprises at least one pivoting positioning piece; the at least one pivoting positioning piece is arranged on one side of the support; the at least one pivoting positioning piece comprises a rotating shaft and a fixing sleeve; the fixing sleeve is arranged in a corresponding pivoting hole on a side wall of the flipping cover; a first end of the rotating shaft is fixedly embedded in a corresponding pivoting hole on a side wall of the support; a second end of the rotating shaft is movably embedded in the fixing sleeve; a plurality of grooves is defined on a surface of the fixing sleeve; one end of the fixing sleeve inserting into a corresponding pivoting hole of the flipping cover has a jagged end face.

2. The stand for the mobile device according to claim 1, wherein a diameter of the rotating shaft is greater than a diameter of the fixing sleeve.

3. The stand for the mobile device according to claim 2, wherein at least one first convex portion is arranged on a surface of a bottom portion of the flipping cover; the at least one first convex portion is perpendicular to the surface of the bottom portion of the flipping cover and extends outwards; a first foam is arranged on a surface of the at least one first convex portion; the at least one first convex portion is configured to support a bottom portion of the mobile device.

4. The stand for the mobile device according to claim 3, wherein a second convex portion is arranged on an inner side of a top portion of the support; the second convex portion extends towards a bottom portion of the support; a second foam is arranged on a surface of the second convex portion; the second convex portion is configured to support the mobile device.

5. The stand for the mobile device according to claim 1, wherein the second end of the rotating shaft movably embedded in the fixing sleeve is a boss structure.

6. The stand for the mobile device according to claim 1, wherein a surface of the first end of the rotating shaft fixedly embedded in the corresponding pivoting hole on the side wall of the support annularly defines fixed grooves parallel to an axis of the rotating shaft.

7. The stand for the mobile device according to claim 1, wherein the plurality of grooves defined on the surface of the fixing sleeve is spaced apart and extends axially toward the fixing sleeve.

8. The stand for the mobile device according to claim 1, wherein the fixing sleeve defines an opening running through the fixing sleeve.

9. The stand for the mobile device according to claim 1, wherein the at least one pivoting positioning piece further comprises a gasket; the gasket is arranged on a corresponding pivoting hole on the side wall of the flipping cover.

* * * * *